US011926506B2

(12) United States Patent
Yuksel

(10) Patent No.: US 11,926,506 B2
(45) **Date of Patent: *Mar. 12, 2024**

(54) SYSTEMS AND METHODS FOR VARIABLE SPEED MODULAR MOVING WALKWAYS

(71) Applicant: Beltways Inc., Tucson, AZ (US)

(72) Inventor: Edip Yuksel, Tucson, AZ (US)

(73) Assignee: Beltways Inc., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/119,096

(22) Filed: Mar. 8, 2023

(65) Prior Publication Data

US 2023/0219789 A1 Jul. 13, 2023

Related U.S. Application Data

(63) Continuation of application No. 17/974,017, filed on Oct. 26, 2022, now Pat. No. 11,787,665, which is a continuation of application No. 17/568,494, filed on Jan. 4, 2022, now Pat. No. 11,530,115.

(60) Provisional application No. 63/133,713, filed on Jan. 4, 2021.

(51) Int. Cl.
*B66B 21/12* (2006.01)
*B66B 25/00* (2006.01)
*B66B 27/00* (2006.01)

(52) U.S. Cl.
CPC .............. *B66B 21/12* (2013.01); *B66B 25/00* (2013.01); *B66B 27/00* (2013.01)

(58) Field of Classification Search
CPC .......... B66B 21/12; B66B 25/00; B66B 27/00
USPC .......................................................... 198/321
See application file for complete search history.

(56) References Cited

U.S. PATENT DOCUMENTS

| | | | |
|---|---|---|---|
| 3,665,863 A | 5/1972 | Patin | |
| 4,232,776 A | 11/1980 | Dean | |
| 6,604,621 B1 | 8/2003 | Matsuo | |
| 11,530,115 B2 | 12/2022 | Yuksel | |
| 2003/0066731 A1 | 4/2003 | Gonzalez Alemany et al. | |
| 2015/0239711 A1 | 8/2015 | Makovec | |
| 2020/0095097 A1* | 3/2020 | Yuksel | B66B 21/025 |

* cited by examiner

*Primary Examiner* — James R Bidwell
(74) *Attorney, Agent, or Firm* — Hall Estill Law Firm

(57) ABSTRACT

A pitless and modular belt-type accelerating moving walkway transit system including at least three substantially identical walkway modules that are leveled and positioned atop a surface such as the ground, floor, road or deck. Each module has an endless belt moving at a different or the same speed wherein the at least three walkway modules are positioned linearly adjacent. Each module having one or more electric motors operably connected to an electrical source and handrails on opposing sides that move in synchrony with the endless belt of the same module.

9 Claims, 10 Drawing Sheets

FIG. 12

SYSTEMS AND METHODS FOR VARIABLE SPEED MODULAR MOVING WALKWAYS

CROSS-REFERENCE TO RELATED APPLICATIONS

The present application is a continuation application of U.S. patent application Ser. No. 17/974,017, filed Oct. 26, 2022, which is a continuation application of U.S. patent application Ser. No. 17/658,494, filed Jan. 4, 2022, now U.S. Pat. No. 11,530,115, which claims the benefit under 35 U.S.C. § 119(e) of U.S. Provisional application Ser. No. 63/133,713, filed Jan. 4, 2021, entitled "SYSTEMS AND METHODS FOR VARIABLE SPEED MODULAR MOVING WALWAYS" [sic], which is hereby expressly incorporated herein in its entirety.

FIELD OF EMBODIMENTS OF THE INVENTION

Embodiments of the present invention relate to modular moving walkways which can accelerate to move people and items at speeds higher than a walking speed and decelerate to a walking speed at an egress point.

SUMMARY OF EMBODIMENTS OF THE INVENTION

Embodiments of the present invention provide a pitless and modular belt-type accelerating moving walkway transit system (hereafter referred to as "Beltway") with a connected chain of interchangeable and substantially identical modules that allow for the acceleration and deceleration of passengers. Each module is embedded with sensors, software and other technologies to facilitate connecting and exchanging data using, for example, module-to-module handshaking to monitor module speed differentials, energy-saving start, and safe shutdown upon impact.

The Beltway includes a series of interchangeable belt-type modules that allows pedestrians to move, for example, through cities and large venues at speeds up to and greater than 7 m/s, which is approximately 10 times the speed of known conventional walkways. Embodiments of the Beltway can move 7,500, or more, people per hour, and efficiently and cost effectively enhance connectivity of existing public transit hubs and large venues to surrounding areas. In an embodiment, the modules connect atop the ground, without the need for the industry standard 1-meter pit running the length of the floor.

Improving upon accelerating moving walkway technology, embodiments of the Beltway can provide fast, easy, and safe mobility 24/7. Energy consumption can be augmented by the installation of solar energy gathering technology.

Brief Description of Embodiments of the Invention

Figure 1:
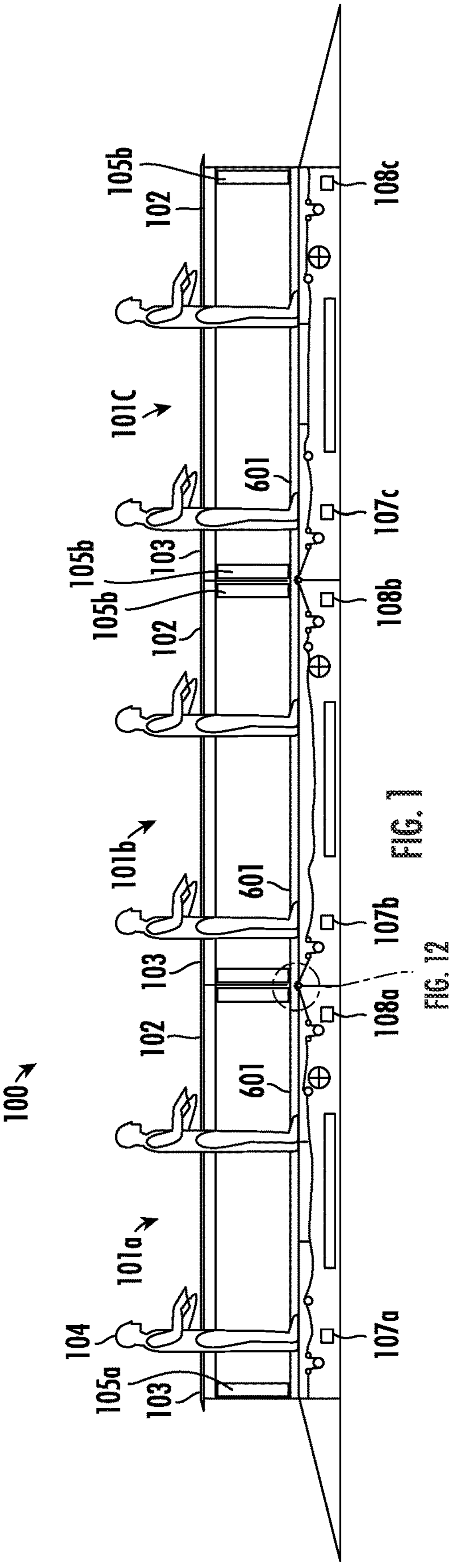
FIG. 1 is a side view of three exemplary walkway modules.

FIG. 1, generally at 100, is a side view of a pitless and modular belt-type accelerating moving walkway transit system (Beltway) that, for purposes of illustration, includes three substantially identical pitless walkway modules 101*a-c* that are leveled and positioned atop a surface such as the ground, floor, road or deck. While modules 101*a-c* are shown for simplicity, it should be understood that there can also be four or more modules, generally represented as 101*a-n*. Generally, a single module 101 can be used alone, as well as in combination with one or more additional modules. The modules 101 can be any size such that the desired Beltway 100 is produced. In another embodiment, the Beltway 100 could include more than a single sized module 101. For example, the Beltway 100 could include 25 modules 101 that have a first size and 25 modules that have a second size.

Figure 5:
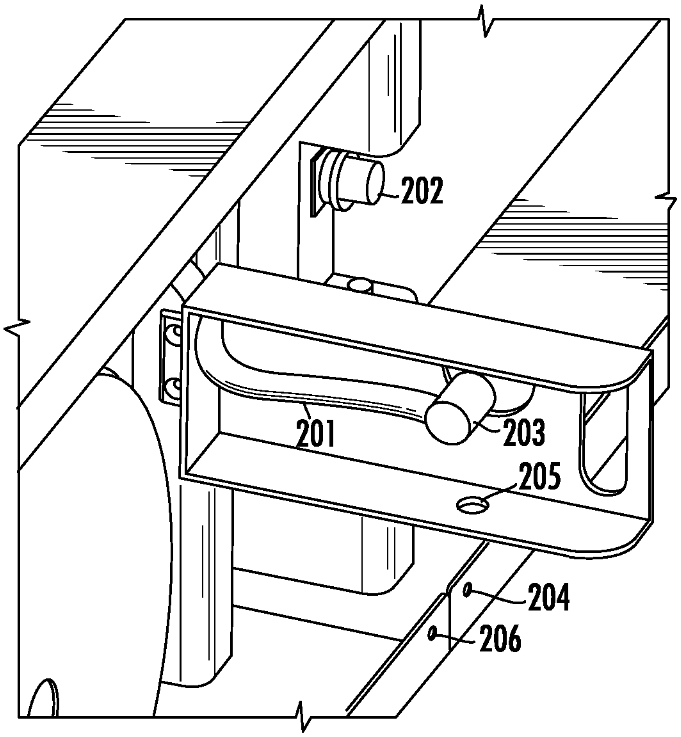
FIG. 5 is a partial perspective view of a module-to-module electromechanical connector in an unconnected position.
Figure 13:
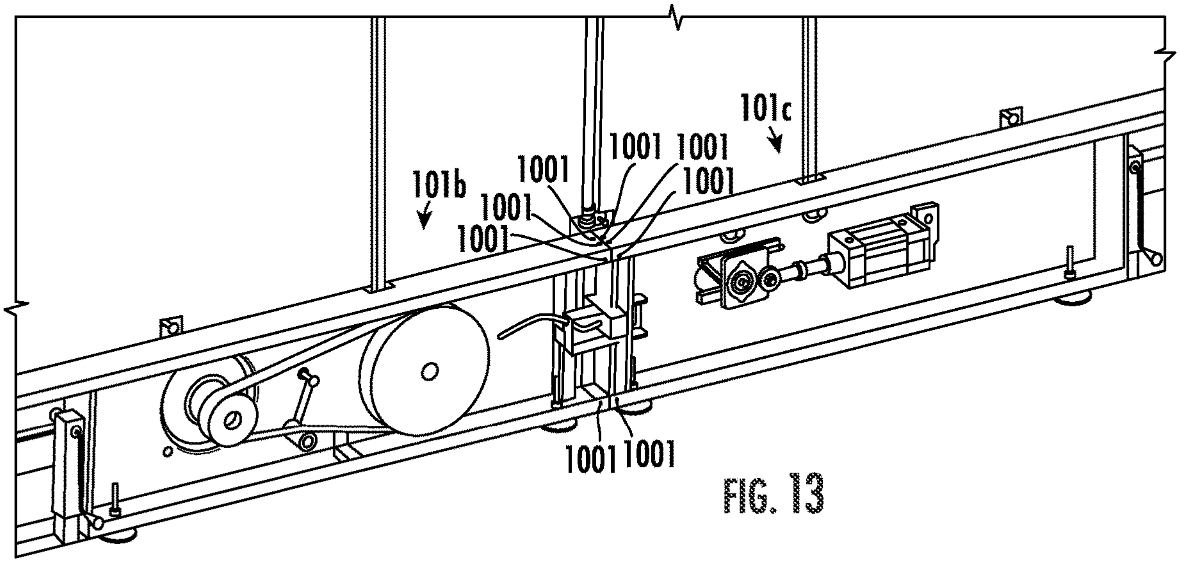
FIG. 13 is a perspective view of a lower handrail gear configuration.

Each module 101*a-c* includes an endless belt 601 (FIG. 9) and a handrail 102 moving at a respectively different or same speed from the other modules 101 in the Beltway 100. Each module 101*a-n* has its own handrail 102*a-n*, respectively, that is independent of any other module's handrail 102. At least immediately linearly adjacent modules (such as 101*a-c*) are connected electrically by a cable 201 (as shown in FIG. 5) and communicate electronically the speed and state of connected modules. Radio waves can also be used to communicate the speed and state between one module and one or more other modules 101*a-c*. Immediately adjacent modules (such as 101*a-c*) are adjoined physically by a fastener such as at least one of a latch, a magnet and a bolt 1001 (FIG. 13). The endless belt 601 can be driven by any type of motor 106, or motors, and any other components known in the art for making moving walkways operational. Similarly, the handrail 102 can be driven by any type of motor known by one of ordinary skill in the art capable of moving each handrail 102 for each module 101. In one exemplary embodiment, the handrail 102 and the belt 601 can be driven by a motorized pulley.

Each module 101*a-n* can include at least one motion sensor 105 to determine when a person or object has entered or exited each module 101. In one embodiment, each module 101 can include a motion sensor 105 on each end of each module 101 to be able to determine when a person gets on each module 101, when a person gets off each module 101, or where a person is on the Beltway 100 when multiple modules 100*a-n* are used. The motion sensors 105 can be used to activate one or more of the modules 101*a-n*, track flow of passengers, detect falls and the like. Each module 101*a-n* can also include a belt sensor 107*a-n* (or sensors) to monitor belt alignment, belt tension, belt speed and the health of the belt. Each module 101*a-n* can also include a motor sensor 108*a-n* (or sensors) for monitoring speed, temperature, vibration, and noise of the motor 105 of each module 101. It should be understood and appreciated that the sensors 105, 107, and/or 108 can be a single sensor or multiple sensors.

If a fall is detected by any of the motion sensors 105, the beltway control system 111 can shut down the belts 601 of certain modules 101 depending on their proximity to the sensor 105 that detected the fall. The belts 601 of the modules 101 can be gradually shut down at any desirable rate or immediately stopped. For example, the beltway control system 111 may shut down the belts 601 of all the modules 101 in the Beltway 100 or it may only shut down the belts 601 of the modules immediately adjacent to the detected fall. In another embodiment, the beltway control system 111 can shut down all the belts 601 immediately adjacent to the detected fall and all the modules 101 in the Beltway 100 that lead up to the detected fall. Depending upon how the beltway control system 111 is set up, the beltway control system 111 can slow the belts 601 of some modules 101 of the Beltway 100, gradually stop the belts 601 of some modules 101 of the Beltway 100, or immediately stop the belts 601 of some modules 101 of the Beltway 100.

Figure 2:
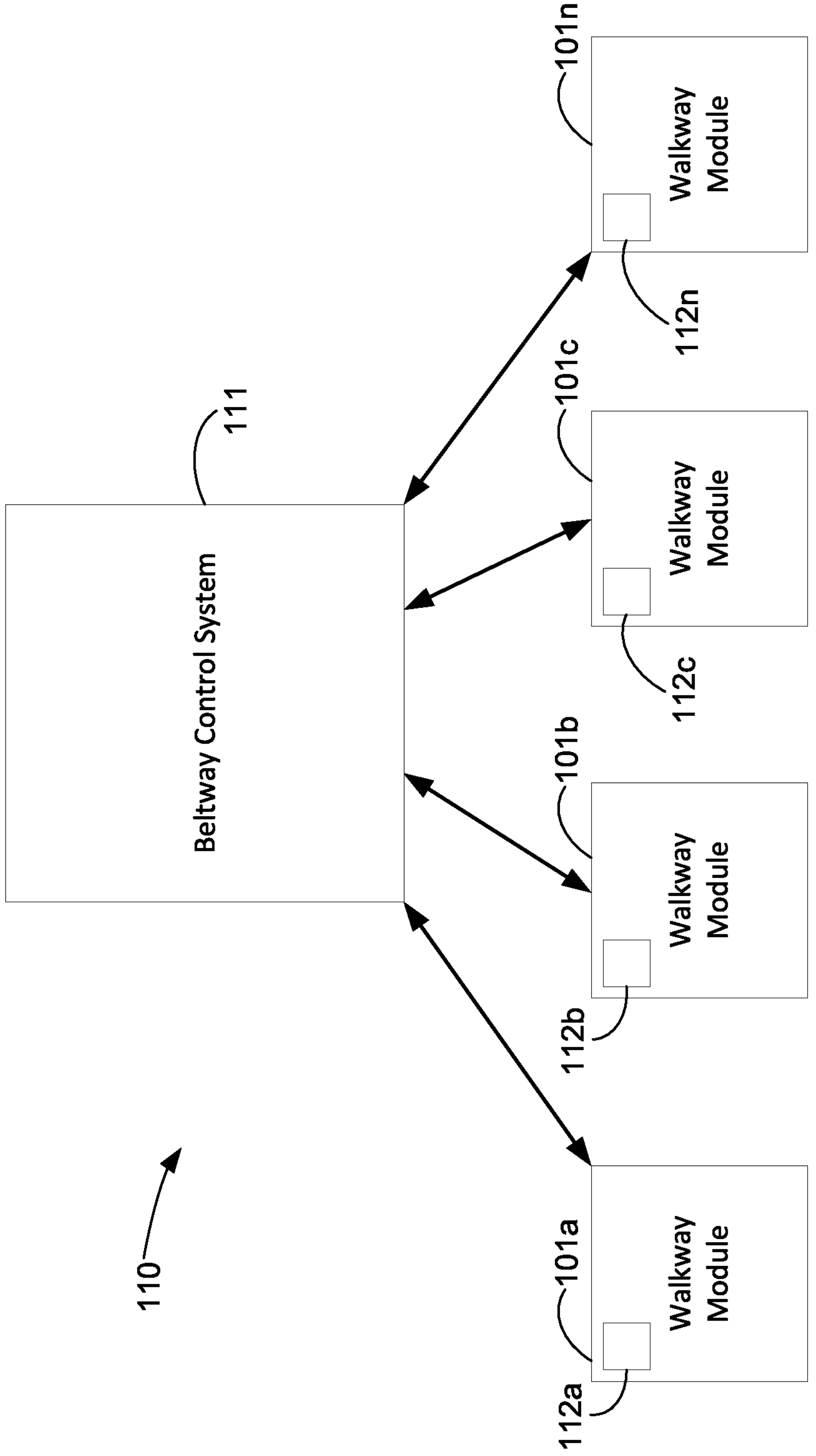
FIG. 2 is a schematic view of a Beltway system constructed in accordance with the present disclosure.

Referring now to FIG. 2, shown therein is a beltway operating system (BOS) 110. The BOS 110 can include a beltway control system 111 for facilitating the operations of the BOS 110. The beltway control system 111 is configured to send and receive data to and from at least one walkway module controller 112 associated with a module 101, or multiple walkway module controllers 112*a-n* associated with multiple modules 101*a-n*. The beltway control system 111 is also configured to carry out all operations of the BOS 110 described herein. Each walkway module controller 112 is the system that controls the operational aspects of each module 101. Operational aspects of each module 101 include, but are not limited to, power application (on or off), belt speed of each module 101, audio indicators, visual indicators, handrail speed of each module 101, motion activation, etc.

Each walkway module controller 112 can receive information from each sensor 105, 107, and/or 108 for each module 101 and send that information to the beltway control system 111. The Beltway 100 could be set up where the information from each sensor 105, 107, and/or 108 can be sent directly to the beltway control system 111 and bypass the respective walkway module controller 112 for that specific module 101. The beltway control system 111 can alter the operation of any of the modules 101*a-n* of the Beltway 100 based on the information received from the sensors 105, 107, and/or 108 and/or each walkway module controller 112.

Figure 3:
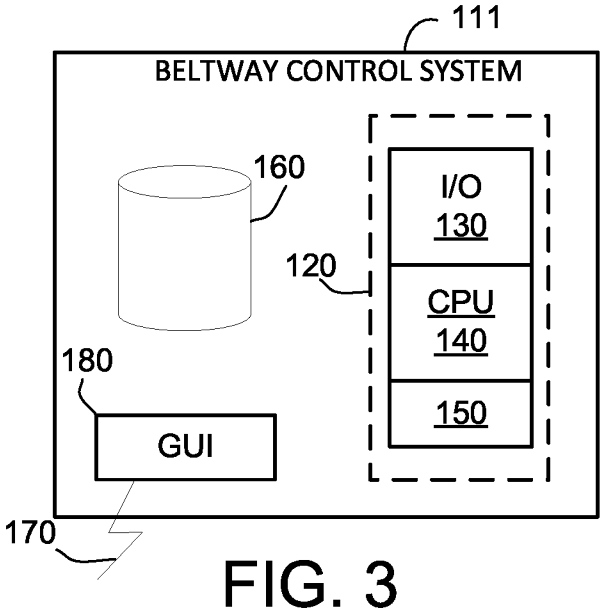
FIG. 3 is a schematic view of a beltway control system constructed in accordance with the present disclosure.

Referring now to FIG. 3 shown therein is a diagram of the beltway control system 111. The beltway control system 111 is capable of executing a computer program product embodied in a tangible processor-readable storage medium to execute a computer process. Data and program files may be input into the beltway control system 111, which reads the files and executes the programs therein using one or more processors. Some of the elements of the beltway control system 111 are shown in FIG. 3, wherein a processor 120 is shown having an input/output (I/O) section 130, a Central Processing Unit (CPU) 140, and a memory section 150. There may be one or more processors 120, such that the processor 120 of the beltway control system 111 comprises a single central-processing unit 140, or a plurality of processing units. The processors may be single-core or multi-core processors. The beltway control system 111 may be a conventional computer, a distributed computer, or any other type of computer. The described technology is optionally implemented in software loaded in memory 150, a disc storage unit 160, and/or communicated via a wired or wireless network link 170 on a carrier signal (e.g., Ethernet, 3G wireless, 1G wireless, LTE (Long Term Evolution), 5G) thereby transforming the beltway control system 111 in FIG. 3 to a special purpose machine for implementing the described operations.

The I/O section 130 may be connected to one or more user-interface devices (e.g., a keyboard, a touch-screen display unit, etc.) or a disc storage unit 160. Computer program products containing mechanisms to effectuate the systems and methods in accordance with the described technology may reside in the memory section 150 or on the storage unit 160 of the beltway control system 111.

The beltway control system 111 can also include a communication interface 180 capable of connecting the beltway control system 111 to an enterprise network via the network link 170, through which the beltway control system 111 can receive instructions and data embodied in a carrier wave. When used in a local area networking (LAN) environment, the beltway control system 111 is connected (by wired connection or wirelessly) to a local network through the communication interface 180, which is one type of communications device. When used in a wide-area-networking (WAN) environment, the beltway control system 111 typically includes a modem, a network adapter, or any other type of communications device for establishing communications over the wide-area network. In a networked environment, program modules depicted relative to the beltway control system 111 or portions thereof may be stored in a remote memory storage device. It is appreciated that the network connections shown are examples of communications devices for and other means of establishing a communications link between the computers may be used.

In an example implementation, a browser application, a compatibility engine applying one or more compatibility criteria, and other modules or programs may be embodied by instructions stored in memory 150 and/or the storage unit 160 and executed by the processor 120. Further, local computing systems, remote data sources and/or services, and other associated logic represent firmware, hardware, and/or software, which may be configured to operate the Beltway 100, and each module 101*a-n* included in the Beltway 100. The beltway control system 111 of the BOS 110 may be implemented using a general purpose computer and specialized software (such as a server executing service software), a special purpose computing system and specialized software (such as a mobile device or network appliance executing service software), or other computing configurations. In addition, user requests, profiles and parameter data, agent profiles and parameter data, location data, parameter matching data, and other data may be stored in the memory 150 and/or the storage unit 160 and executed by the processor 120.

Figure 4:
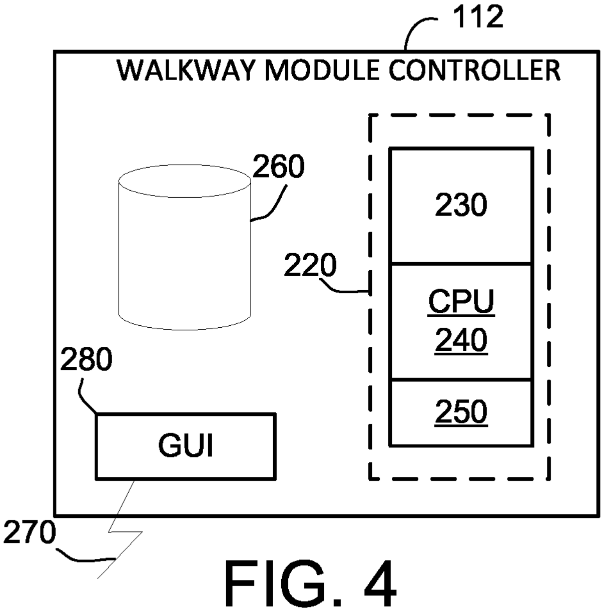
FIG. 4 is a schematic view of a walkway module controller constructed in accordance with the present disclosure.

Referring now to FIG. 4 shown therein is a diagram of each walkway module controller 112. Each walkway module controller 112 is capable of executing a computer program product embodied in a tangible processor-readable storage medium to execute a computer process. Data and program files may be input into each walkway module controller 112, which reads the files and executes the programs therein using one or more processors. Some of the elements of each walkway module controller 112 are shown in FIG. 4, wherein a processor 220 is shown having an input/output (I/O) section 230, a Central Processing Unit (CPU) 240, and a memory section 250. There may be one or more processors 220, such that the processor 220 of each walkway module controller 112 comprises a single central-processing unit 240, or a plurality of processing units. The processors may be single-core or multi-core processors. Each walkway module controller 112 may be a conventional computer, a distributed computer, or any other type of computer. The described technology is optionally implemented in software loaded in memory 250, a disc storage unit 260, and/or communicated via a wired or wireless network link 270 on a carrier signal (e.g., Ethernet, 3G wireless, 1G wireless, LTE (Long Term Evolution), 5G) thereby transforming each walkway module controller 112 in FIG. 4 to a special purpose machine for implementing the described operations.

The I/O section 230 may be connected to one or more user-interface devices (e.g., a keyboard, a touch-screen display unit, etc.) or a disc storage unit 260. Computer program products containing mechanisms to effectuate the systems and methods in accordance with the described technology may reside in the memory section 250 or on the storage unit 260 of each walkway module controller 112.

Each walkway module controller 112 can also include a communication interface 280 capable of connecting each walkway module controller 112 to an enterprise network via the network link 270, through which each walkway module controller 112 can receive instructions and data embodied in a carrier wave. When used in a local area networking (LAN) environment, each walkway module controller 112 is connected (by wired connection or wirelessly) to a local network through the communication interface 280, which is one type of communications device. When used in a wide-area-networking (WAN) environment, each walkway module controller 112 typically includes a modem, a network adapter, or any other type of communications device for establishing communications over the wide-area network. In a networked environment, program modules depicted relative to each walkway module controller 112 or portions thereof may be stored in a remote memory storage device. It is appreciated that the network connections shown are examples of communications devices for and other means of establishing a communications link between the computers may be used.

In an example implementation, a browser application, a compatibility engine applying one or more compatibility criteria, and other modules or programs may be embodied by instructions stored in memory 250 and/or the storage unit 260 and executed by the processor 220. Further, local computing systems, remote data sources and/or services, and other associated logic represent firmware, hardware, and/or software, which may be configured to operate each module 101*a-n* in the Beltway 100. Each walkway module controller 112 may be implemented using a general purpose computer and specialized software (such as a server executing service software), a special purpose computing system and specialized software (such as a mobile device or network appliance executing service software), or other computing configurations. In addition, user requests, profiles and parameter data, agent profiles and parameter data, location data, parameter matching data, and other data may be stored in the memory 250 and/or the storage unit 260 and executed by the processor 220.

The embodiments of the invention described herein are implemented as logical steps in one or more computer systems. The logical operations of the present invention are implemented (1) as a sequence of processor-implemented steps executed in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

Data storage and/or memory may be embodied by various types of storage, such as hard disk media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" (e.g., memory 150 and/or 250) means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" or "storage medium" expressly does not include a transitory medium, such as a carrier signal, but the computer instructions can be transferred to the memory wirelessly.

Figure 6:
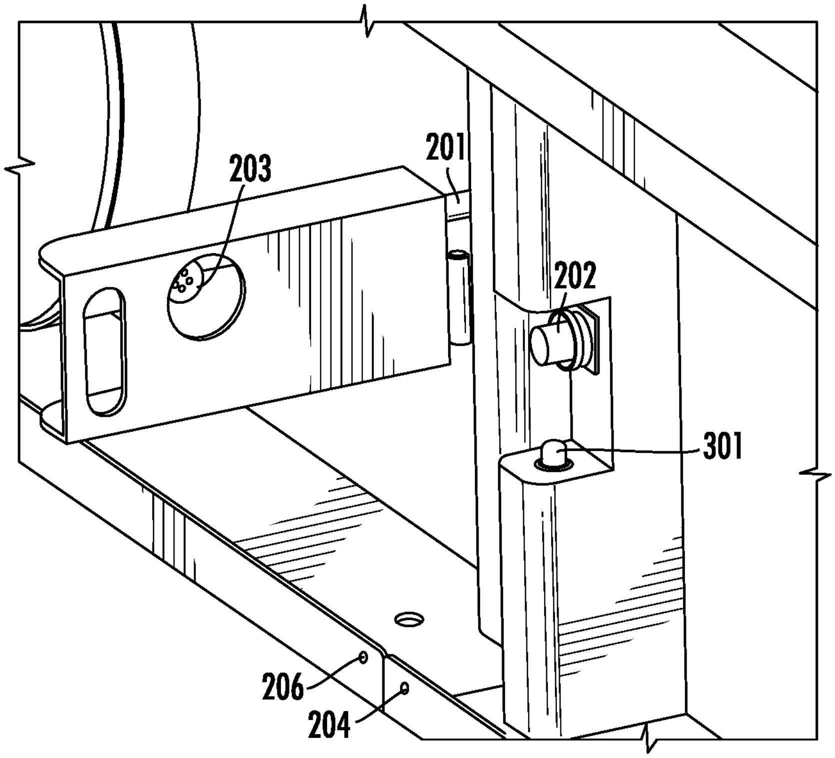
FIG. 6 is a second partial perspective view of a module-to-module electromechanical connector in an unconnected position.
Figure 7:
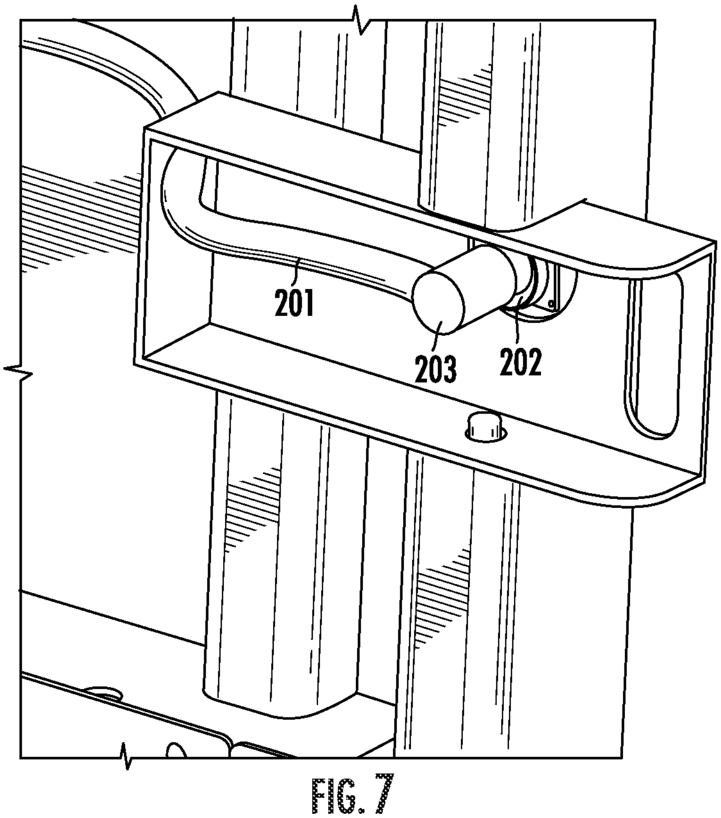
FIG. 7 is a partial perspective view of a module-to-module electromechanical connector in a connected position.

As shown in FIGS. 5-7, cables 201 can use a male/female connector 202/203 to supply power to an electric motor (not shown) that drives the endless belt 601 and handrail 102 of each module 101*a-c* at the same speed, in a synchronized manner. This allows multiple modules 101*a-c* to connect in a chain to form the system 100.

The power source is electricity which is connected to the electrical grid and a first active module (e.g., module 101*b*, module 101*c* or, in the more general embodiment, module 101*n*). Solar photovoltaic panels on top of the structure (not shown) covering the Beltway, in the case of outdoor applications, can be used to supplement the energy. An exemplary AC cable (not shown) that can be used to provide electricity can have a National Electrical Manufacturers Association (NEMA) 5-15-P power connector that plugs into a standard 110 VAC wall outlet and a NEMA 5-15-R receptacle that plugs into a first active module (e.g., module 101*n*). In certain embodiments, the modules may require 460 VAC, 3-phase, 60 Hz power supply. For outdoor applications, energy from solar cells will pass through a photovoltaic inverter that is operably connected to the AC power line (not shown). Generally, the AC power line and cables 201 together provide electricity for the lighting, electric motor (s), and related devices such as AC drive of the modules 101*a-n*.

Cables 201 can be operably connected to receive power from the AC power line, and can use a male/female connector 202/203 to supply power to an electric motor (not shown) that drives the endless belt 601 and a motor that drives the handrail 102 of each module 101*a-n* at the same speed, in a synchronized manner. This allows multiple modules 101*a-n* to connect in a chain to form the system 100. Power can also be supplied to the modules 101 via a busway of power cables disposed underneath the Beltway 100.

Modules 101*a-n*, at or proximate its entrance side 103 (as determined by passenger 104 direction), will have, for example, a motion sensor 105 that can detect passengers. However, the first module 101*a* and/or last module 101*n*, can remain idle and be used as a spare module that can replace another module 101*b-m* (where m is less than n) that becomes inoperative. When module 101*a* (and/or module 101*n*) is used as a spare, when its motion sensor 105 detects a passenger 104, it will activate the belt 601 of at least one adjacent module 101*b* (rather than the belt 601 of module 101*a*). Similarly, when module 101*n* is used as a spare, it will activate the belt 601 of at least one adjacent module 101*m* (rather than the belt 601 of module 101*n*).

In addition, the motion sensor 105*a* of module 101*a* can also be used to activate the belt 601 of module 101*a* when module 101*a* replaces a module 101*b-m* that may become inoperative. It should be understood that motion sensors can be photoelectric motion sensors, which can be reflective-type photoelectric sensors or thru-beam type sensors. In addition, other motion sensor technologies can be utilized, such as combined photoelectric and microwave motion sensor switches, or microwave sensor switches.

In an embodiment, each module 101*a-n* is configured, such as by programming, to change the direction of the belt 601, provided that no passenger 104 is on the belt 601 of any module 101*a-n*. Without passengers 104 on any module 101*a-n*, modules 101*a-n* will be inactive and motionless, and the direction of the belt 601 of any, or all, of the modules 101*a-n* can be reversed. For example, the direction of the belt 601 can be reversed to accommodate passenger 104 demand during morning or evening rush hour.

However, when the sensors 105, positioned at or proximate the entrance side 103 of the first inactive module 101*a*, detect a passenger 104, such detection will trigger movement of the belt 601 and handrail 102 of module 101*b*, and also trigger movement of the belt 601 and handrail 102 of one or more adjacent modules (e.g., one or more of modules 101*c-n*), depending on the velocity of the passenger 104. Generally, modules 101*b-m* can be activated such that there can be at least one active module (with a moving belt 601 and handrail 102) in front of any passenger(s) 104 and at least one active module behind any passenger 104 who stands (or walks) on an active module (101*c-n*).

As previously stated herein, the Beltway 100 can have any number of modules 101*a-n* to create a moving walkway of a desired length. In one embodiment, all of the modules 101 in the Beltway 100 can be the same speed. In other embodiments, the modules 101 can have varied speeds depending on their position in the Beltway 100. Typically, when three or more modules 101 are used in the Beltway 100, there is an initial module, at least one full speed module and an end module. The initial module can have an initial speed that makes transition to the Beltway 100 easier. The at least one full speed module can have any desired top speed such that a safe transition from the initial module to the full speed module is accomplished. The end module can be any end speed such that safe transition can be accomplished by a user when exiting the Beltway 100. The end speed and initial speed can different speeds or be the same speed depending upon the desired setup of the Beltway 100.

In certain embodiments, the Beltway 100 can include at least five modules. In these embodiments, the Beltway 100 can include an initial module 101, an accelerating module 101, a full speed module, a decelerating module and an end module. The speed of the accelerating module and the speed of the decelerating module is greater than the speed of the initial module and the end module, respectively, but less than the speed of the full speed module. The inclusion of the accelerating and decelerating modules permits the Beltway 100 to achieve higher top speeds, lower initial speeds, and lower end speeds than traditional moving walkways because they provide a transition speed between the initial speed and the full speed and the end speed and the full speed. It should be understood and appreciated that all of these modules are the same just being operated at varying speeds. It should also be understood that the Beltway 100 can include any number of full speed modules depending upon the length of each module and the length of the desired Beltway 100.

In a further embodiment, the Beltway 100 can include multiple accelerating modules positioned between the initial module and the full speed module(s) and multiple decelerating modules positioned between the full speed module(s) and the end module. The multiple accelerating and decelerating modules permits the Beltway 100 to achieve an even higher full speed. In an exemplary embodiment, the Beltway 100 can have a first accelerating module and a second accelerating module. The first accelerating module positioned adjacent to the initial module has a higher speed than the initial module and a lower speed than the second accelerating module positioned adjacent to the first accelerating module on the opposite side of the initial module. The second accelerating module positioned between the first accelerating module and the full speed module has a higher speed than the first accelerating module and a lower speed than the full speed module(s). The full speed module is positioned between the second accelerating module on one side and the first decelerating module on the other side. The first decelerating module has a speed lower than the full speed module and higher than a first decelerating module positioned on the opposite side of the second decelerating module from the full speed module. The first decelerating module has a speed lower than the second decelerating module and higher than the end module positioned on the opposite side of the first decelerating module from the second decelerating module. The number of accelerating and decelerating modules incorporated into the Beltway 100 can vary depending upon the length of the Beltway 100, the top speed desired, the entry and exit speeds desired, and the desired speed differential between modules operating at different speeds.

Modules 101*a-n* can also include a visual medium (not shown) for providing color-coded visual cues that correspond to the speed of each module, wherein the color-coded visual cues can be in the order of a rainbow, or some other color spectrum, thereby preparing passengers to anticipate and adapt to the change of the speed of each module 101*a-n*.

The visual medium could also be dimmed or brightened to provide the visual cue that corresponds to the speed of each module 101.

Modules 101*a-n* can also include a speaker for providing audio information, instruction, alerts, or cues via music with varying tempo that corresponds to the speed of at least one module 101*a-n*, thereby preparing passengers to anticipate and adapt to the change of the linear speed of the belt 601 of any module 101*a-n*.

FIG. 5 is a partial perspective view of a module-to-module electromechanical male/female connector 202/203 in an unconnected position. Each module 101*a-n* includes, for example, a mechanical fastener such as spring-loaded plunger 301 (FIG. 6) and aperture 205 to establish and secure an electrical connection. Optionally, a magnetic latch (not shown) can be used in addition to or in lieu of a mechanical fastener. There are also apertures 204, 206 for nuts and bolts, screws and so forth to connect and secure or fasten linearly adjacent the modules 101 to each other with, for example, a steel plate (not shown).

FIG. 6 is a second partial perspective view of a module-to-module electromechanical male/female connector 202/203 in an unconnected position. Each module 101*a-n* wirelessly, or via a wired connection, communicates its state to a control center (not shown) which, in turn, controls and regulates the belt 601 speed differential of modules 101*a-n*, such that the system self-regulates acceleration/deceleration and comes to a gradual halt if any of the modules become nonoperational. In an embodiment, the control center can be a smart IoT control system. FIG. 7 is a partial perspective view of an electromechanical male/female connector 202/203 in a connected position.

Figure 8:
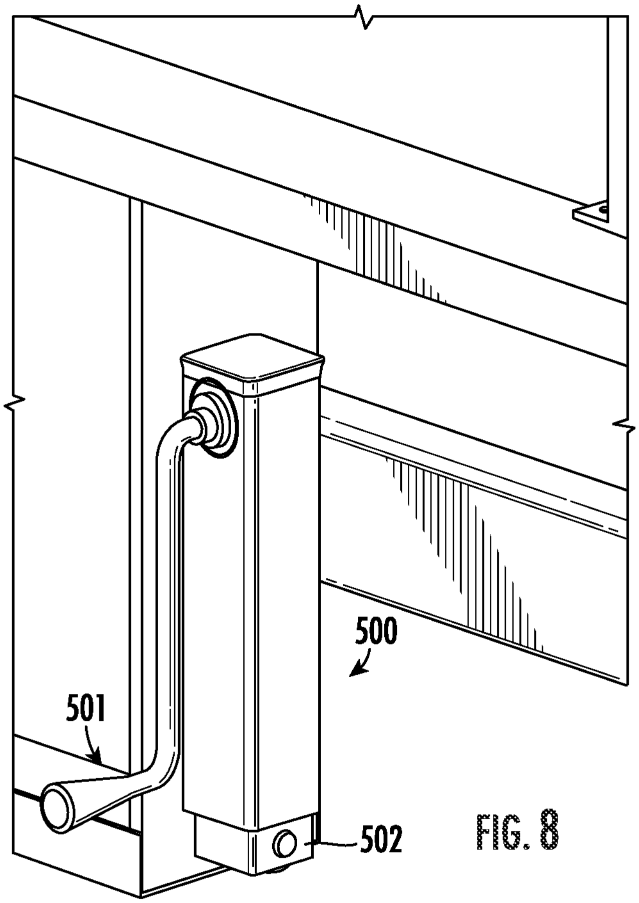
FIG. 8 is a perspective view showing an adjustable leveling foot of a walkway module.

FIG. 8 is a perspective view showing an adjustable leveling foot 500 of a module 101*a-n*. The handle 501 can be rotated in one direction (e.g., clockwise) to extend telescoping arm 502, and be rotated in the opposite direction (e.g., counterclockwise) to retract the telescoping arm 502.

Figure 9:
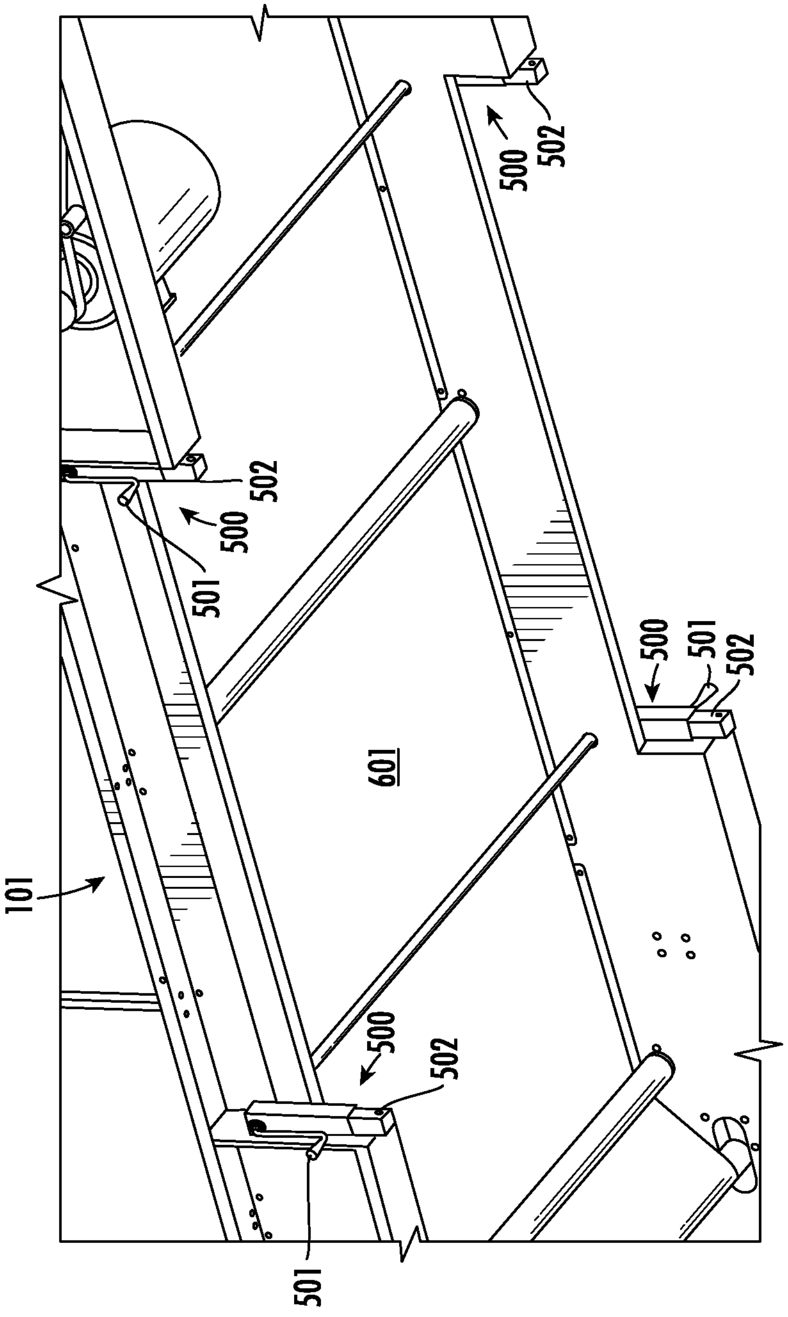
FIG. 9 is a perspective view showing four adjustable leveling feet of a walkway module.

FIG. 9 is a perspective view showing four adjustable leveling feet 500 of a walkway module 101. The four adjustable feet 500 of each module 101*a-n* can be individually raised and lowered to place the belt 601 of each module 101*a-n* in substantial horizontal alignment. Thus, the belt 601 of any individual module 101*a-n* is horizontally aligned, and the belt 601 of all individual modules 101*a-n* are collectively in substantial horizontal alignment. In an embodiment, an automated alignment system can also be provided and utilized in lieu of adjustable leveling feet 500.

The modules 101*a*, 101*b* are configured to permit the removal and replacement of belts 601 by opening the side door (not shown) of the encasing mount, and loosening the tension in the belt and sliding the belt out from over the walking platform and under the motor shafts, without the disassembling or dismantling of the module's mechanical components. In an embodiment, belts 601 may include thin layers of rubber reinforced with high tensile strength fibers, such as para-aramid material.

Figure 10:
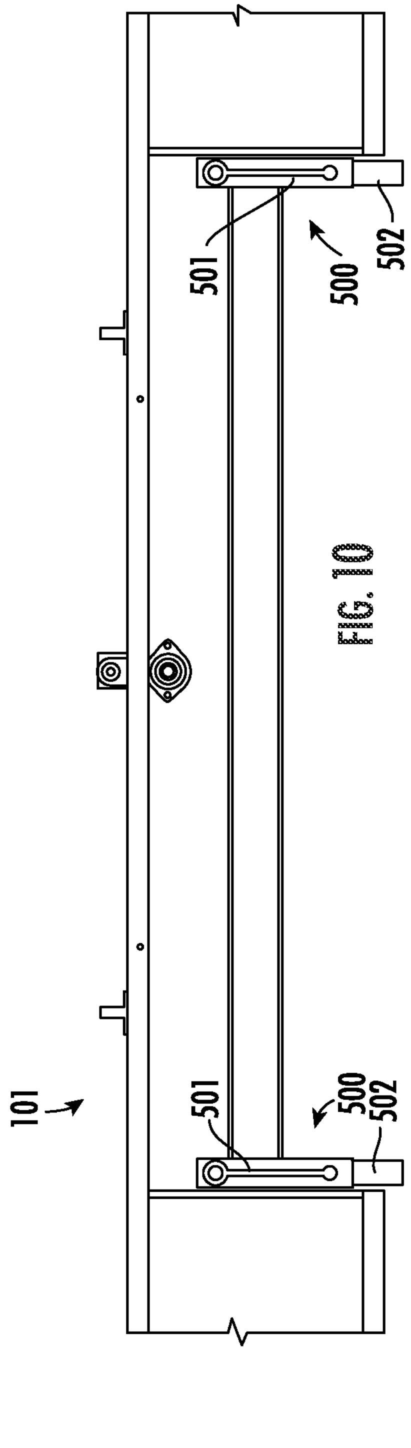
FIG. 10 is a side view showing two adjustable leveling feet of a walkway module.

FIG. 10 is a side view showing two adjustable leveling feet 500 of a portion of a module 101.

Figure 11:
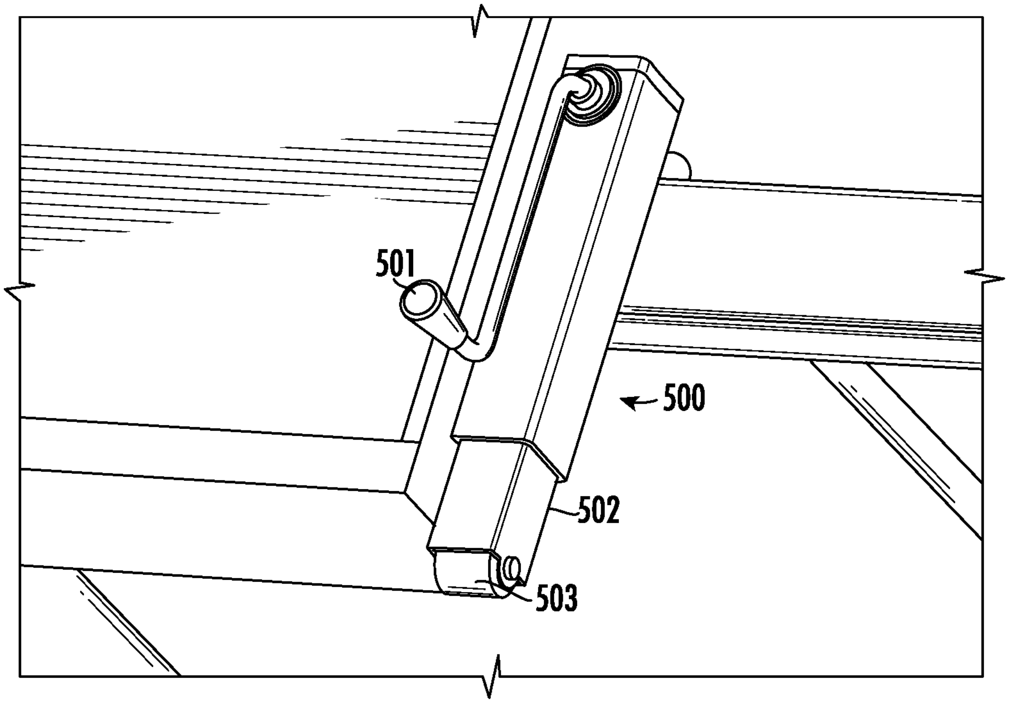
FIG. 11 is a perspective view showing retractable wheels on an adjustable leveling foot.

FIG. 11 is a perspective view showing retractable wheels 503 on an adjustable leveling foot 500. Each module 101*a-n* can have retractable wheels 503 to facilitate replacing a module 101*b-m* that becomes inoperative with the first module 101*a* and/or last module 101*n*, as described above.

Figure 12:
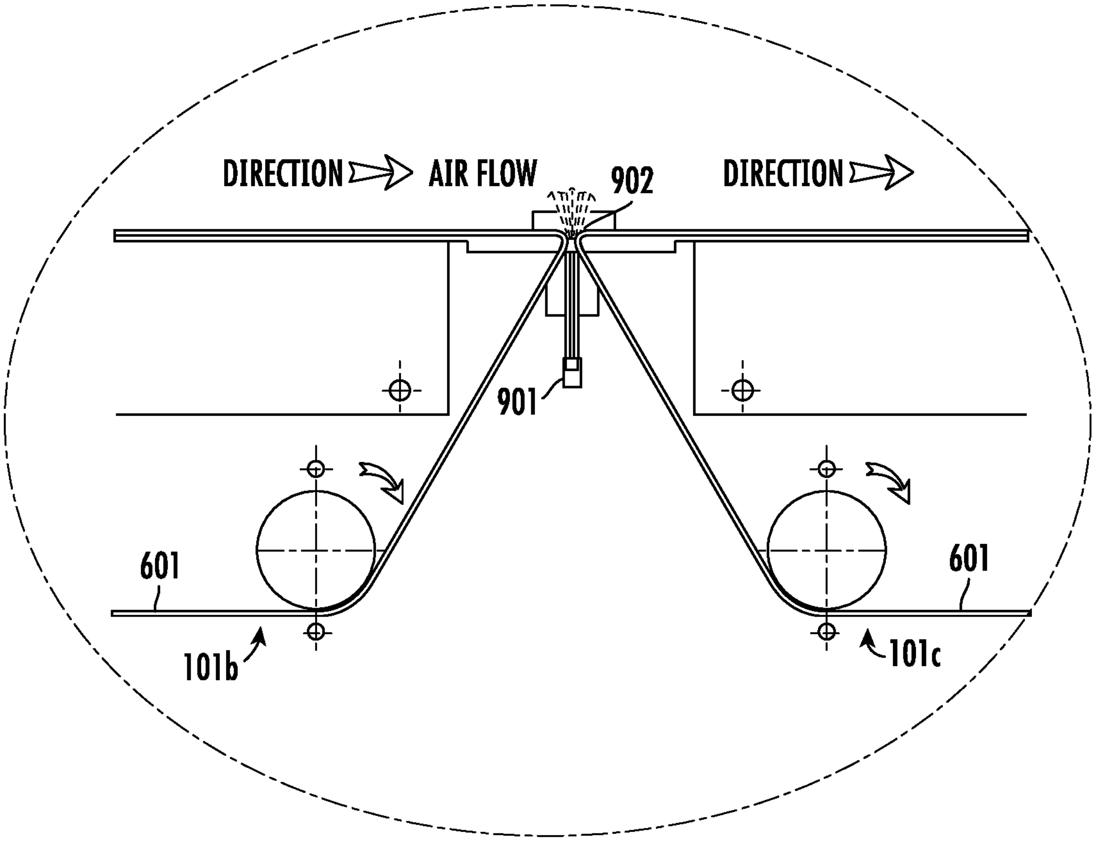
FIG. 12 is a side view showing an air knife between two walkway modules.

FIG. 12 is a side view showing an air knife 901 between two walkway modules 101*b*, 101*c*. Air knife 901 provides a powerful air draft passing upwardly from beneath the lower portion of belt 601 and through any space 902 between the belts 601 of the respective modules 101*b*, 101*c*. The air draft prevents debris from approaching or accumulating in the space 902, and facilitates removal of any accumulated debris that may accumulate in space 902. The air knife may also provide air conditioning. Each module 101 can also include a gap sensor 903 for monitoring the space 902 (transit gap) between the belts 601 of adjacent modules 101. The beltway control system 111 can shut down any, or all, of the modules 101 if the gap sensor 903 detects something in the transit gap for a predetermined amount of time. The gap sensor 903 can be any type of sensor known in the art capable of performing the functions described herein, such as photoelectric or reflex array sensors.

FIG. 13 is a perspective view of a lower handrail gear configuration.

Figure 14:
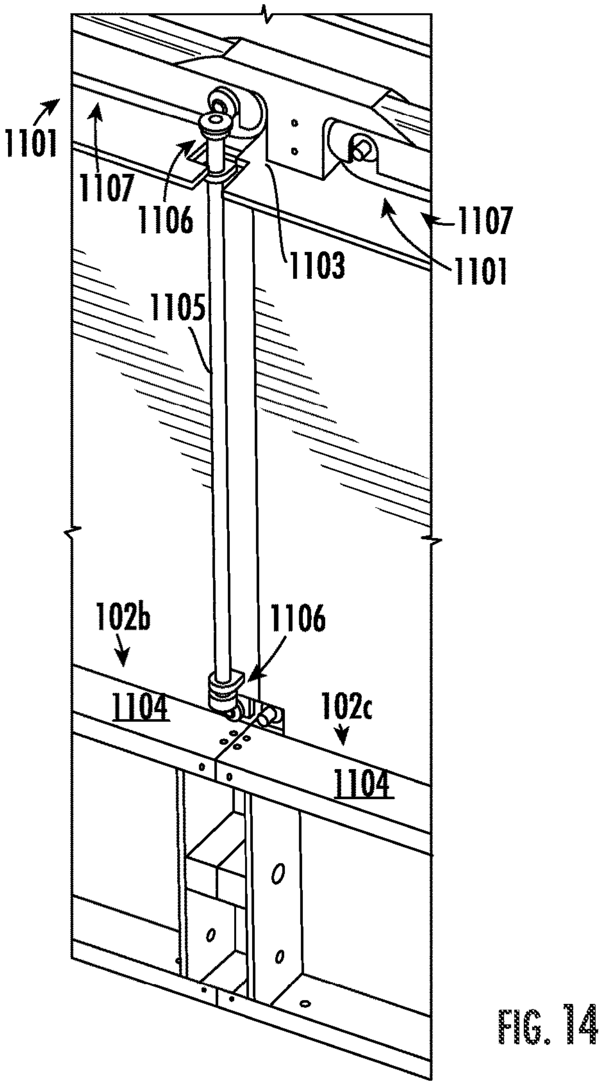
FIG. 14 is a perspective view of an upper handrail gear configuration.

FIG. 14 is a perspective view of an upper handrail gear configuration 1106. Each module 101*b*, 101*c* includes handrails on opposing sides of the belt 601 (not shown). In FIG. 14, a single handrail 1101 is shown for each module 101*b*, 101*c*.

The handrails 1101 of each module 101*b*, 101*c* are fastened to each side by inserting them within the "u-channel" (not shown) in the base of the frame 1104, and secured with latches and bolts (not shown). Handrails of adjacent modules can be connected via any means known in the art. One example is a T-shaped connector 1103, which covers the gap between the handrails 1101 of adjacent modules 101*b*, 101*c*.

The handrails 1101 move in synchrony with the belt 601 (not shown) of its respective module 101*b*, 101*c* via a mechanical connection, such as an arrangement of shafts 1105 and gears 1106, which are operably connected to the motor (not shown) driving the belt 601 of the respective module 101*b*, 101*c*. In addition, handrails 1101 can be disinfected by devices such as ultraviolet-c lamps and lights (not shown) placed proximate the underside 1107 of the handrails 1101.

Figure 15:
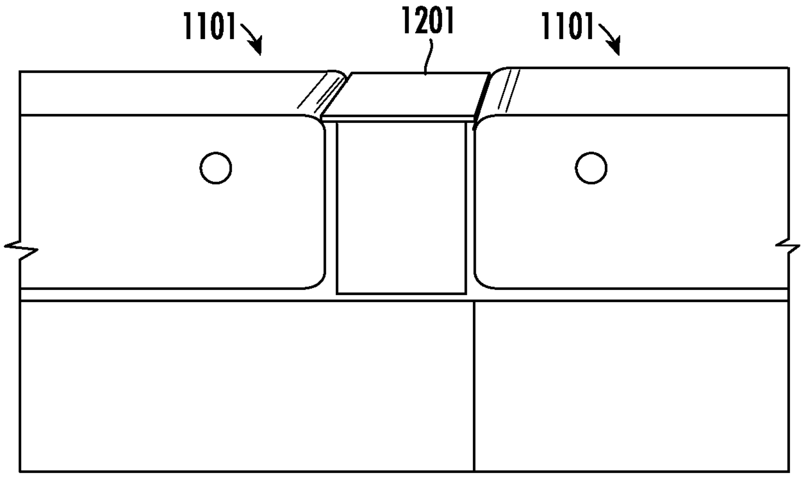
FIG. 15 is a perspective view of a first embodiment of a handrail connection.

FIG. 15 is a perspective view of a first embodiment of a handrail connection. This embodiment of the depressed handrail connection 1201 may provide more safety since it is not flush with the two adjacent handrails 1101, and reduces the fixed portion of the handrail.

Figure 16:
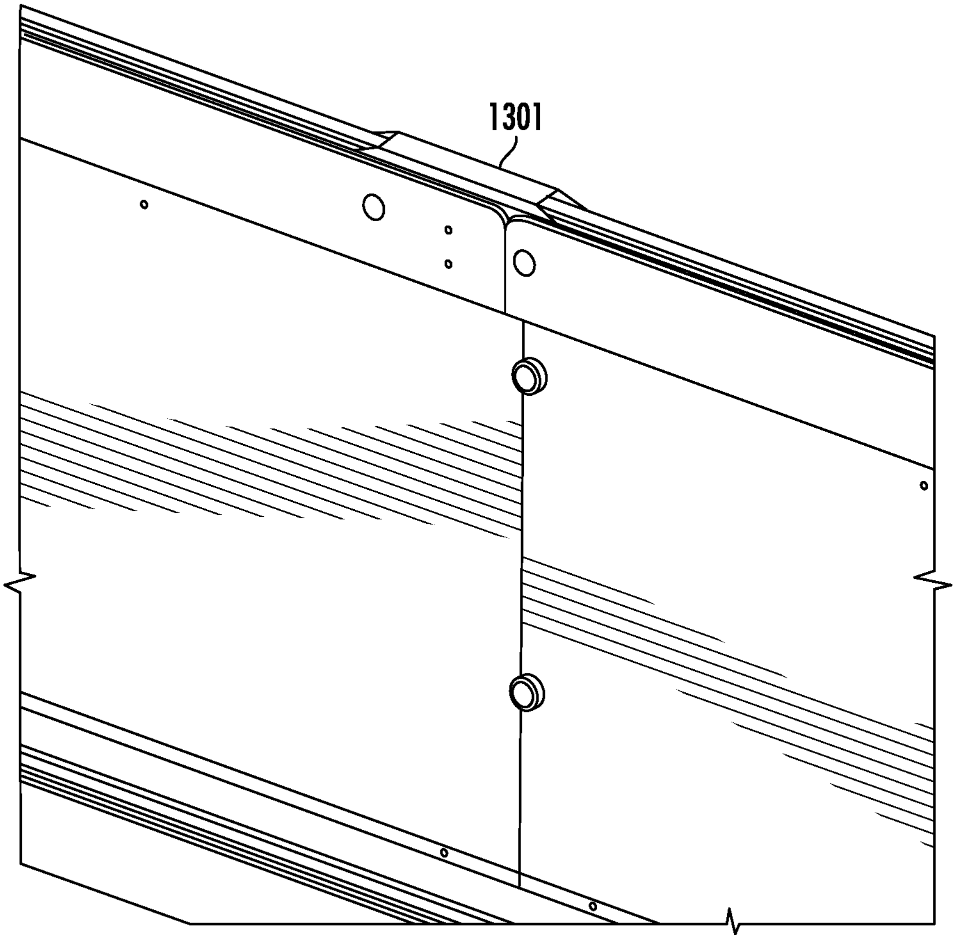
FIG. 16 is a perspective view of a second embodiment of a handrail connection.

FIG. 16 is a perspective view of a second embodiment of a handrail connection, showing the embodiment of FIG. 14 with a cover plate 1301.

What is claimed:

1. A pitless and modular belt-type accelerating moving walkway transit system comprising at least five walkway modules, the at least five walkway modules comprising:

an initial walkway module having an initial speed to permit a person to transition to the transit system more easily;

a first accelerating walkway module positioned adjacent to the initial walkway module having a higher speed than the initial walkway module;

a full speed walkway module positioned adjacent to the first accelerating walkway module having a higher speed than the first accelerating walkway module;

a first decelerating walkway module positioned adjacent to the full speed walkway module having a lower speed than the full speed walkway module; and an end walkway module positioned adjacent to the first decelerating walkway module having a lower speed than the first decelerating walkway.

2. The pitless and modular belt-type accelerating moving walkway transit system of claim 1 further comprising:

a second accelerating module positioned between the first accelerating walkway module and the full speed walkway module and having a higher speed than the first accelerating walkway module and a lower than the speed of the full speed walkway module; and a second decelerating module positioned between the first decelerating walkway module and the full speed walkway module and having a higher speed than the first decelerating walkway module and a lower than the speed of the full speed walkway module.

3. The pitless and modular belt-type accelerating moving walkway transit system of claim 1 wherein the all of the modules in the pitless and modular belt-type accelerating moving walkway transit system are interchangeable.

4. The pitless and modular belt-type accelerating moving walkway transit system of claim 1, wherein each module comprises an interlocking system comprising at least one of a mechanical fastener and a magnetic latch.

5. The pitless and modular belt-type accelerating moving walkway transit system of claim 1, wherein each module communicates its state to a beltway control system that transmits signals to each module to regulate the speed of each module.

6. The pitless and modular belt-type accelerating moving walkway transit system of claim 5, wherein the communication and regulation of speed occur substantially simultaneously.

7. The pitless and modular belt-type accelerating moving walkway transit system of claim 1, wherein a motion detector of each module is capable of stopping or starting the movement of the belt by communicating the presence of a passenger to a beltway control system that activates successively the belts of adjacent modules, depending on the velocity of the passenger, such that there will be a minimum of one or more active modules in front and behind any passenger.

8. The pitless and modular belt-type accelerating moving walkway transit system of claim 1, wherein each module is programmed to stop the system and change the direction of the endless belt at preset times based on the flow of passenger traffic.

9. The pitless and modular belt-type accelerating moving walkway transit system of claim 1, further comprising a manual or automated leveling system for leveling modules individually or collectively, the leveling system comprising leveling feet for raising and lowering at least a portion of each module to make the endless belt of each module level on an even or uneven surface.

* * * * *